(12) United States Patent
Koizumi et al.

(10) Patent No.: US 7,719,160 B2
(45) Date of Patent: May 18, 2010

(54) CORELESS AND BRUSHLESS DIRECT-CURRENT MOTOR, GIFFORD MCMAHON (GM) CRYOGENIC COOLER, PULSE TUBE CRYOGENIC COOLER, CRYOPUMP, MAGNETIC RESONANCE IMAGING (MRI) APPARATUS, SUPERCONDUCTING MAGNET (SCM) APPARATUS, NUCLEAR MAGNETIC RESONANCE (NMR) APPARATUS, AND CRYOGENIC COOLER FOR COOLING SEMICONDUCTOR

(75) Inventors: Tatsuo Koizumi, Tokyo (JP); Tomohiro Koyama, Tokyo (JP); Teruo Takahashi, Ehime (JP); Makoto Ishikawa, Ehime (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 792 days.

(21) Appl. No.: 11/528,525

(22) Filed: Sep. 28, 2006

(65) Prior Publication Data
US 2008/0024034 A1    Jan. 31, 2008

(30) Foreign Application Priority Data
Jul. 27, 2006   (JP)   ............................. 2006-205435

(51) Int. Cl.
H02K 1/22    (2006.01)
(52) U.S. Cl. ........................................ 310/266; 310/114
(58) Field of Classification Search ................ 310/266, 310/112–114, 52, 54, 57
See application file for complete search history.

(56) References Cited

U.S. PATENT DOCUMENTS

| 3,462,626 | A | * | 8/1969 | Kluss | .......................... 310/114 |
| 4,769,997 | A | | 9/1988 | Pundak | |
| 5,304,884 | A | * | 4/1994 | Kitajima et al. | ............. 310/198 |
| 5,361,588 | A | | 11/1994 | Asami et al. | |

FOREIGN PATENT DOCUMENTS

| JP | 2004-242392 A | 8/2004 |
| JP | 2004-242394 A | 8/2004 |
| JP | 2005-094830 A | 4/2005 |
| JP | 2005-160274 A | 6/2005 |
| JP | 2005-160277 A | 6/2005 |

* cited by examiner

*Primary Examiner*—Dang D Le
(74) *Attorney, Agent, or Firm*—Rader, Fishman & Grauer, PLLC

(57) ABSTRACT

A coreless and brushless direct-current motor includes an armature coil wound without core and formed in the shape of a saddle; an outside rotor magnet formed by a permanent magnet, the outside rotor magnet being provided at an outside of the armature coil in the shape of a cylinder so as to face the armature coil, the outside rotor magnet being rotated by the magnetic field; an inside rotor magnet formed by a permanent magnet, the inside rotor magnet being provided in the shape of a cylinder at an inside of the armature coil so that the inside rotor magnet has a pole opposite to the outside rotor magnet and a rotational shaft is independently provided; an output shaft connected to the inside rotor magnet; and a sealing part of a barrier structure which sealing part partitions the armature coil and the outside rotor magnet to an outside of the inside rotor magnet and seals the armature coil and the outside rotor magnet.

2 Claims, 10 Drawing Sheets

CORELESS AND BRUSHLESS DIRECT-CURRENT MOTOR, GIFFORD MCMAHON (GM) CRYOGENIC COOLER, PULSE TUBE CRYOGENIC COOLER, CRYOPUMP, MAGNETIC RESONANCE IMAGING (MRI) APPARATUS, SUPERCONDUCTING MAGNET (SCM) APPARATUS, NUCLEAR MAGNETIC RESONANCE (NMR) APPARATUS, AND CRYOGENIC COOLER FOR COOLING SEMICONDUCTOR

BACKGROUND OF THE INVENTION

1. Field of the Invention

The present invention generally relates to coreless and brushless direct-current motors, Gifford McMahon (GM) cryogenic coolers, pulse tube cryogenic coolers, cryopumps, Magnetic Resonance Imaging (MRI) apparatuses, Superconducting Magnet (SCM) apparatuses, Nuclear Magnetic Resonance (NMR) apparatus, and cryogenic coolers for cooling semiconductors.

More particularly, the present invention relates to a coreless and brushless direct-current motor used as a power source of a Stirling type cryogenic cooler or the like. The Stirling type cooler is used for a closed circuit cooling system or the like and has a sealing container that receives an expansion unit and a compressor, a GM cryogenic cooler, a pulse tube cryogenic cooler, a cryopump, a MRI apparatus, a SCM apparatus, an NMR apparatus, and a cryogenic cooler for cooling a semiconductor having the coreless and brushless direct-current motor as a power unit.

2. Description of the Related Art

When a cryogenic cooling apparatus using a gas compressor or gas expanding device such as a Stirling type cryogenic cooler is manufactured and assembled or continuously operated, operation gas or contaminant gas such as moisture or carbon dioxide from components is generated.

In addition, when an electric motor is used as a driving source, contaminants are generated from, for example, a core part, a varnish, or a wire coating in an electric motor part.

In order to prevent influence of these contaminants, a structure where a cup-shaped barrier configured to provide gas-tight isolation between a coil winding and a rotor is provided so as to come in contact with an electric motor used as a driving source, is suggested in U.S. Pat. No. 4,769,997. More specifically, as a cored motor, a single stator (armature) and a driving electric part are arranged outside of a casing partitioned by a non-magnetic cup-shaped cover and a magnetic rotor is completely isolated from the outside environment.

In addition, a Gifford McMahon (GM) cryogenic cooler and a pulse tube cryogenic coolers wherein an electric motor is used as a driving source is suggested in U.S. Pat. No. 5,361,588.

SUMMARY OF THE INVENTION

Accordingly, embodiments of the present invention may provide a novel and useful coreless and brushless direct-current motor, Gifford McMahon (GM) cryogenic cooler, pulse tube cryogenic cooler, cryopump, Magnetic Resonance Imaging (MRI) apparatus, Superconducting Magnet (SCM) apparatus, Nuclear Magnetic Resonance (NMR) apparatus, and cryogenic cooler for cooling a semiconductor, in which one or more of the problems described above are eliminated.

More specifically, the embodiments of the present invention may provide a coreless and brushless direct-current motor wherein two rotor magnets having opposite poles between which an armature coil formed without a core is put are concentrically, synchronously, and independently rotated and the armature coil and the rotor magnets are isolated and sealed so that there is no over current loss and hysteresis loss and little leakage of magnetic flux.

The embodiments of the present invention may also provide a coreless and brushless direct-current motor wherein an inside magnetic rotor, an output shaft and a driven device are completely shielded from contaminants generated from an armature coil so that the service life of the driven device can be maintained for a long time, and little leakage of the magnetic flux and high motor efficiency can be achieved.

The embodiments of the present invention may also provide a cryogenic cooler and application apparatuses having the above mentioned coreless and brushless direct-current motor as a driving device whereby a good cooling property can be achieved.

One aspect of the present invention may be to provide a coreless and brushless direct-current motor, including:

an armature coil wound without core and formed in the shape of a saddle, the armature coil including a plurality of coils separately provided on an external surface with a cylindrical circumference, the armature coil generating a magnetic field in a case where a direct current is applied;

an outside rotor magnet formed by a permanent magnet, the outside rotor magnet being provided at an outside of the armature coil in the shape of a cylinder so as to face the armature coil, the outside rotor magnet being rotated by the magnetic field;

an inside rotor magnet formed by a permanent magnet, the inside rotor magnet being provided in the shape of a cylinder at an inside of the armature coil so that the inside rotor magnet has a pole opposite to the outside rotor magnet and a rotational shaft is independently provided, the inside rotor magnet rotated synchronously with the outside rotor magnet by the magnetic field;

an output shaft connected to the inside rotor magnet, the output shaft being rotated following rotation of the inside rotor magnet and making a connected driven device rotate; and a sealing part of a barrier structure which sealing part partitions the armature coil and the outside rotor magnet to an outside of the inside rotor magnet and seals the armature coil and the outside rotor magnet.

Another aspect of the present invention may be to provide a coreless and brushless direct-current motor, including:

a flat armature coil wounded without a core, the flat armature coil including a plurality of coils separately provided on an external surface with a cylindrical circumference, the flat armature coil generating a magnetic field in a case where a direct current is applied;

a sub-rotor magnet formed by a permanent magnet, the sub-rotor magnet being provided in the shape of a cylinder so as to face the flat armature coil, the sub-rotor magnet being rotated by the magnetic field;

a main rotor magnet formed by a permanent magnet, the main rotor magnet having a pole opposite to the sub-rotor magnet where a rotational shaft is independently and concentrically provided and the flat armature coil is put between the main rotor magnet and the sub-rotor magnet, the main rotor magnet synchronously rotated with the sub-rotor magnet by the magnetic field;

an output shaft connected to the main rotor magnet, the output shaft being rotated following rotation of the main rotor magnet and making a connected driven device rotate; and a sealing part of a barrier structure, the sealing part partitioning the flat armature coil and the sub-rotor magnet to an outside of the main rotor magnet and sealing the flat armature coil and the sub-rotor magnet.

Other aspect of the present invention may be to provide a Gifford McMahon cryogenic cooler, including:

a power unit made by the coreless and brushless direct-current motor discussed above;

a rotational motion-straight line motion conversion mechanism configured to convert a rotational motion of the power unit to a straight line motion;

a valve mechanism configured to receive a rotational output of the power unit and to switch a flow path of operation fluid sent out from a high pressure side of a compressor to a low pressure side of the compressor;

a cylinder configured to take the operation fluid supplied and discharged by the valve mechanism so as to cool the operation fluid at an optional numbers of stages; and a displacer having a plurality of cold storage devices.

Other aspect of the present invention may be to provide a pulse tube cryogenic cooler, including:

a cold head;

a compressor configured to supply operation gas with a high pressure to the cold head and receive the operation gas from the cold head as low pressure gas;

a valve unit connected between the cold head and the compressor and mutually connecting a high pressure side and a low pressure side of the compressor to the cold head;

a buffer tank configured to control phase difference between pressure change and a flow rate change of the operation gas; and the coreless and brushless direct-current motor discussed above, the coreless and brushless direct-current motor being configured to rotate the valve unit.

Other aspect of the present invention may be to provide a cryopump, Magnetic Resonance Imaging (MRI) apparatus, Superconducting Magnet (SCM) apparatus, Nuclear Magnetic Resonance (NMR) apparatus, and cryogenic cooler for cooling a semiconductor having the above-mentioned GM cryogenic cooler or the pulse tube cryogenic cooler.

Other objects, features, and advantages of the present invention will become more apparent from the following detailed description when read in conjunction with the accompanying drawings.

DETAILED DESCRIPTION OF THE PREFERRED EMBODIMENT

A description will now be given, with reference to FIGS. 1 through 10, of embodiments of the present invention.

First Embodiment

Figure 1:
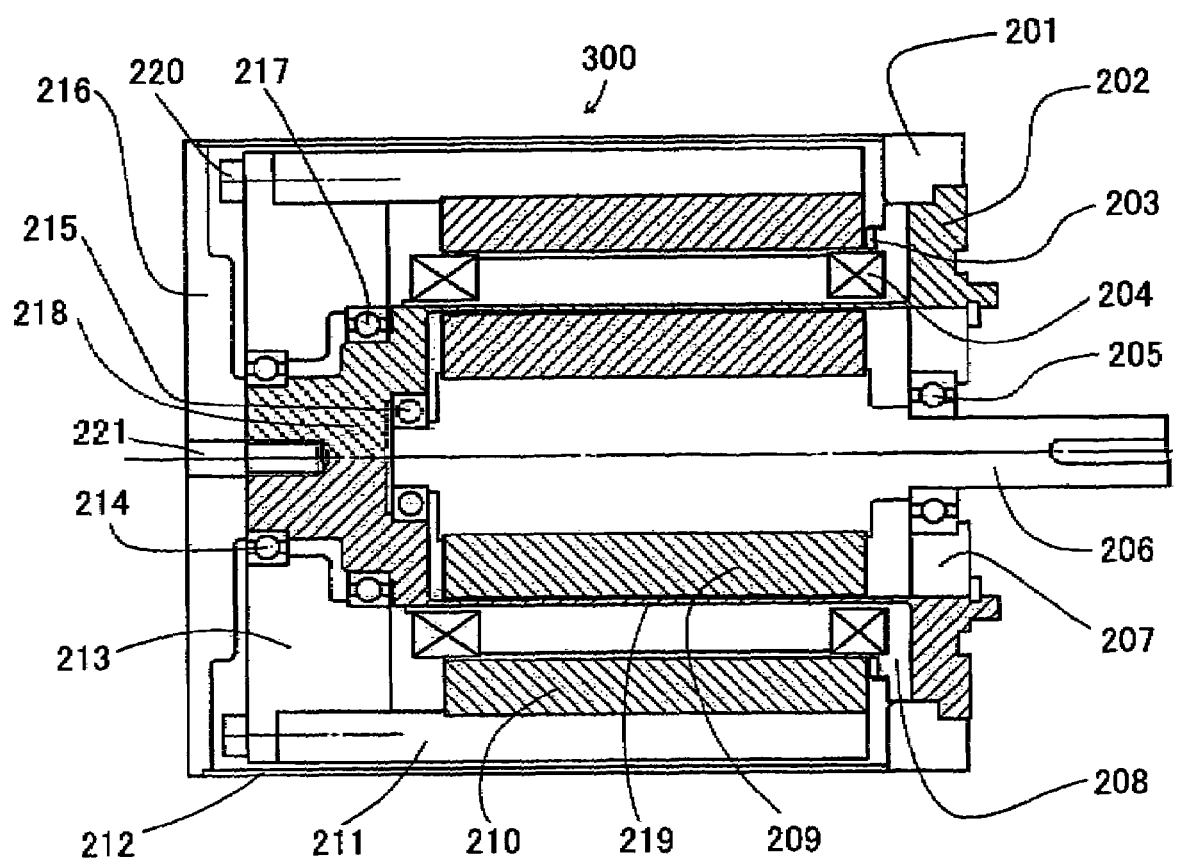
FIG. 1 is a cross-sectional view of a coreless and brushless direct-current motor of a first embodiment of the present invention.
Figure 2:
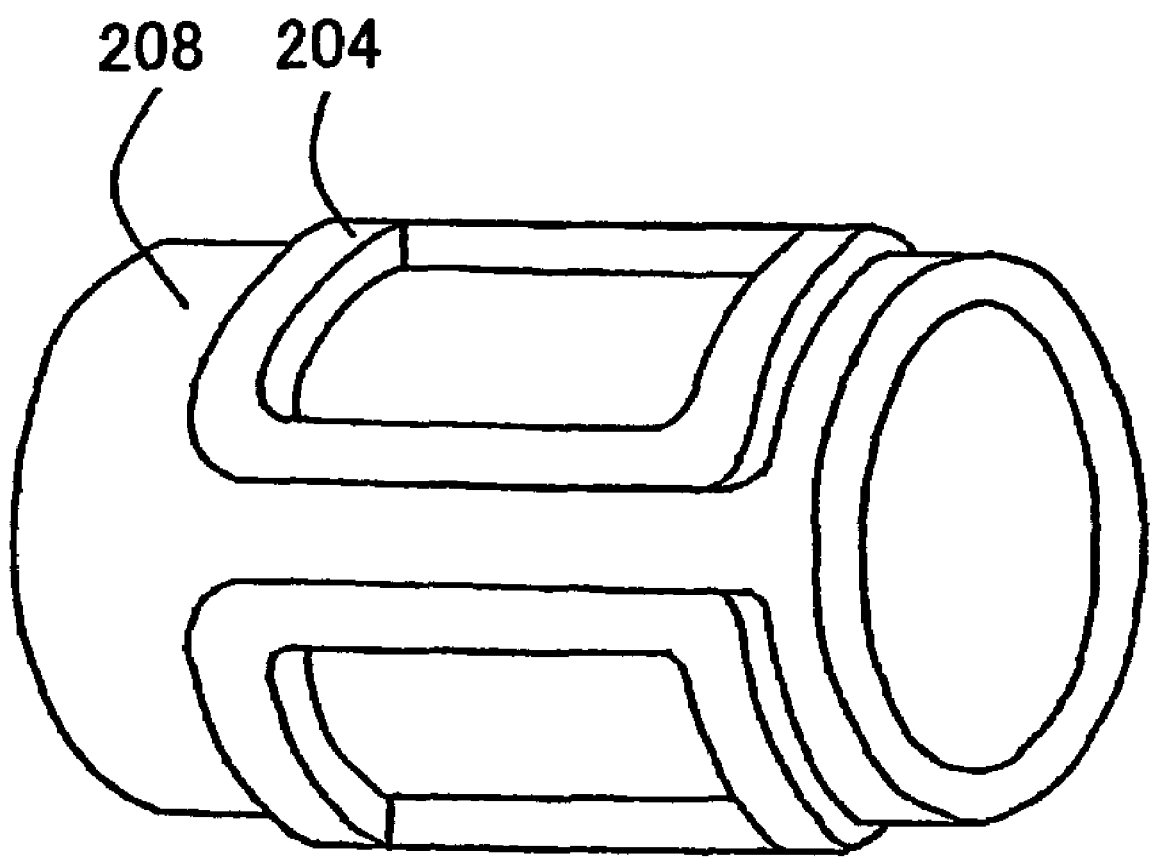
FIG. 2 is a perspective view of a saddle type armature coil attaching part forming the coreless and brushless direct-current motor of the first embodiment of the present invention.

FIG. 1 is a cross-sectional view of a coreless and brushless direct-current motor of a first embodiment of the present invention. FIG. 2 is a perspective view of a saddle type armature coil attaching part forming the coreless and brushless direct-current motor of the first embodiment of the present invention.

Referring to FIG. 1 and FIG. 2, a coreless and brushless direct-current motor 300 of a first embodiment of the present invention has an armature coil 204 wound without core on a barrier part 219 and a coil holder 208. One end of a housing 218 is extended to the barrier part 219. The coil holder 208 is connected to a casing 202 and the barrier part 219. The armature coil 204 is formed in the shape of a saddle and includes plural coils separately provided on the outer surface of a cylindrical circumference.

When a direct current is applied to the armature coil 204, a magnetic field is generated. Because of this, there is no over current loss or hysteresis loss and it is possible to maintain high electric motor efficiency.

As shown in FIG. 1, an outside rotor magnet 210 is formed by a cylindrical permanent magnet so as to face the armature coil 204. The outside rotor magnet 210 is rotated by a magnetic field generated by the armature coil 204.

The outside rotor magnet 210 is connected to a yoke 211. The yoke 211 is fixed to a yoke flange 213. The yoke flange 213 is rotatably supported by a housing via a first bearing 214 and a second bearing 217. The first bearing 214 and the second bearing 217 are received.

An air space between the outside rotor magnet 210 and the armature coil 204 is sealed by the yoke flange 213, the coil holder 208, an outside case forming an electric motor housing, and a case lid 216.

An inside rotor magnet 209 is formed by a cylindrical shaped permanent magnet. The inside rotor magnet 209 concentrically faces the outside rotor magnet 210 having opposite pole. The inside rotor magnet 209 and the outside rotor magnet 210 form a pair. The inside rotor magnet 209 is synchronously rotated by a magnetic attraction force of the outside rotor magnet 210 due to the magnetic field of the armature coil 204.

Because of this, leakage of the magnetic flux in a direction parallel to a shaft center is dramatically reduced by the face to face positional arrangement of a magnetic pole and a magnetic body. As a result of this, it is possible to obtain high electric motor efficiency.

In addition, although rotational shafts of the outside rotor magnet 210 and the inside rotor magnet 209 are concentrically provided, the rotational shafts of the outside rotor magnet 210 and the inside rotor magnet 209 are arranged independently of each other. Therefore, the outside rotor magnet 210 and the inside rotor magnet 209 are completely partitioned. Therefore, generated output torque is directly transmitted to an output shaft 206.

It is general practice that the outside rotor magnet 210 and the inside rotor magnet 209 have surface magnet type structures where the permanent magnet is arranged on a circumference of the rotor. However, the outside rotor magnet 210 and the inside rotor magnet 209 may have embedded magnet type structures where the permanent magnet is provided inside the rotor.

An aeolotropic ferrite magnet or a rare-earth magnet having high magnetic flux density is often used as a material of the permanent magnet.

In addition, the outside rotor magnet 210 and the inside rotor magnet 209 between which the armature coil 204 is put face each other and the air space between the outside rotor magnet 210 and the armature coil 204 is sealed by the yoke flange 213, the coil holder 208, the yoke 211, a pressing flange 201 and the outside case 212. Because of this, leak of magnetic flux from the armature coil 204 is kept to a minimum.

Therefore, reduction of the output torque is kept to a minimum so that the efficiency of the electric motor can be maintained. Hence, there is no need for an increase of electric current in the armature coil 204 for supplementing the output torque so that the efficiency of the electric motor can be obtained.

Furthermore, the contaminants generated from the armature coil 204 are completely shielded from the inside rotor magnet 209, the output shaft 206 and the driven device not shown. Hence, the service life of the driven device can maintain for a long time.

In addition, the outside rotor magnet 210 and the inside rotor magnet 209 can be commonly used. In this case, assembling is simple and high-volume production can be easily done.

The cylindrical shaped inside rotor magnetic 209 is connected to the external circumference of the output shaft 206. One end of the output shaft 206 is rotatably supported by the housing 218 via a third bearing 215. Another end of the output shaft 206 is rotatably supported by a bearing box 207 via a fourth bearing 205.

In addition, the output shaft 206 is rotated following rotation of the inside rotor magnet 209 and makes the connected driven device not shown rotate.

Because of this, the generated output torque is transmitted to the output shaft 206. As a result of this, necessary transmission torque is similar to the rated torque so as to be securely transmitted to the driven device not shown.

The housing 218 is formed in a body with the barrier part 219 formed by extension of one end of the housing 218 and the casing 202. The housing 218 is fixed to the case lid 216 forming a part of a housing of the electric motor by bots not shown.

At an end of the housing 218, the output shaft 206 where the inside rotor magnet 209 is connected is rotatably supported via the third bearing 215. At the external circumference of the housing 218, the yoke flange 213 where the outside rotor magnet 210 is connected is rotatably supported via the first bearing 214 and the second bearing 217.

The barrier part 219 as a sealing part of a barrier structure extends from one end of the housing 218 as shown in FIG. 1, the armature coil 204 and the outside rotor magnet 210 are isolated outside of the inside rotor magnet 209, and are formed in a body with the housing 218 in the shape of a cup so as to include the inside rotor magnet 209.

The barrier part 219 partitions and seals the armature coil 204 and the outside rotor magnet 210, together with the coil holder 208 where the armature coil 204 is connected, and the casing 202 forms a part of the housing of the electric motor, along with the pressing flange 201, the outside case 212 and the case lid 216.

Because of this, leakage of the magnetic flux in a direction parallel to a shaft center is prevented so that it is possible to obtain high electric motor efficiency.

In addition, the contaminants generated from the armature coil 204 are completely shielded from the inside rotor magnet 209, the output shaft 206 and the driven device not shown. Hence, the service life of the driven device can maintain for a long time.

The sealing part of the barrier structure is made of a non-magnetic material. For example, a non-magnetic metal basically can be used as the material of the sealing part of the barrier structure.

As a armature electric current control device not shown, a hole IC 203 where a hole element and an amplifier circuit are integrated with each other is preferably used.

The hole IC 203 is provided on the circumference surface of the coil holder 208 where the armature coil 204 is connected so as to face the outside rotor magnet 210. A magnetic pole position of the outside rotor magnet 210, namely a switching point, from a pole N to a pole S or from the pole S to the pole N is detected so that a direct electric current is controlled by a single from the hole IC 203.

Accordingly, by arranging the armature coil 204 and the outside rotor magnet 210 to the outside of the casing 202 and the barrier part 219, the hole IC 203 can be operated by only the outside rotor magnet 210.

In addition, an armature electric current control device not shown is provided outside of the electric motor housing via a lead line not shown and wired to the hole IC 203. Therefore, the magnetic pole position of the outside rotor magnet 210 can be securely detected so that it is possible to implement proper rotational control.

The lead line not shown or a lead line from the hole elements is wired via an outlet not shown but provided on the housing of the electric motor.

The driven device not shown, for example, a cryogenic cooler or pump, is connected to the output shaft 206 so as to be rotated by the inside rotor magnet 209 and the output shaft 206.

The contaminants generated from the armature coil 204 are completely shielded from the inside rotor magnet 209, the output shaft 206 and the driven device not shown. Hence, the service life of the driven device can maintained for a long time.

Second Embodiment

Figure 3:
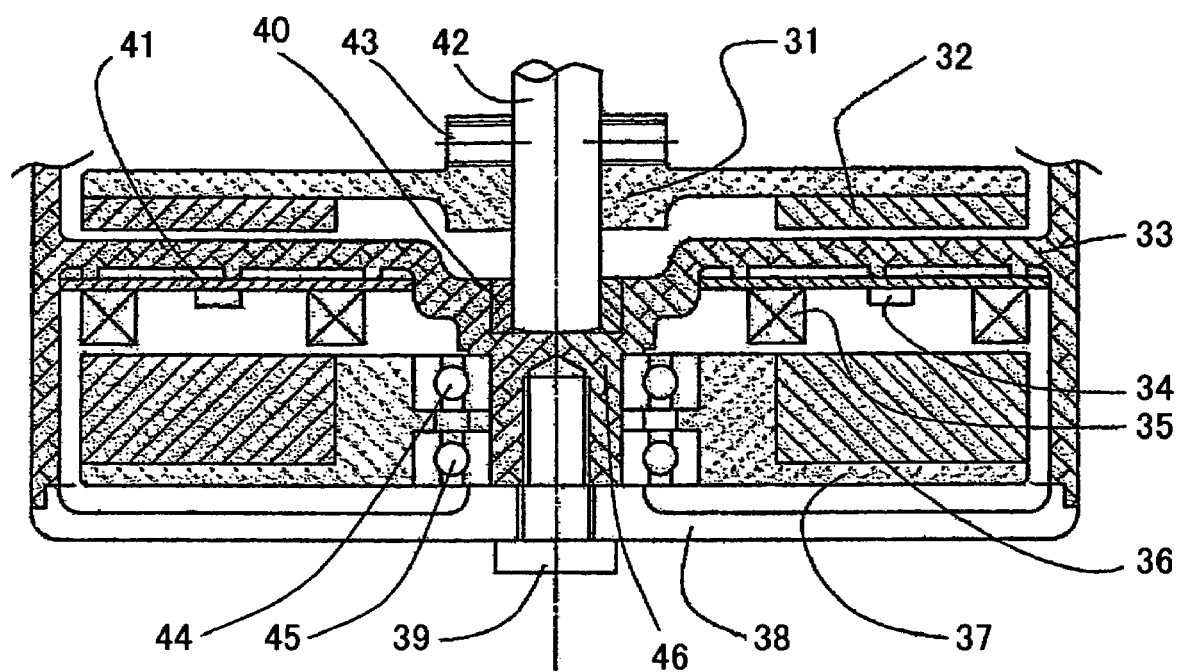
FIG. 3 is a cross-sectional view of a coreless and brushless direct-current motor of a second embodiment of the present invention.

FIG. 3 is a cross-sectional view of a coreless and brushless direct-current motor of a second embodiment of the present invention.

Referring to FIG. 3, a flat armature coil 35 of a coreless and brushless direct-current motor of a second embodiment of the present invention has a coreless coil wound in a ring shape. Plural flat armature coils 35 are provided in a cylindrical circumference shape on a board 41 surface connected to a barrier part 33 to which one end of a housing 46 is extended.

When a direct current is applied to the flat armature coil 35, a magnetic field is generated. Because of this, there is no over current loss and hysteresis loss and it is possible to maintain high electric motor efficiency.

The thickness of the coreless coil can be made less than the original coil external diameter. Hence, it is possible to easily correspond to limitations of lay-out of an inside of the electric motor. In addition, the coreless coil can be formed by stacking coils. Because of this, the coreless coil, compared to a cored coil such as with an iron core, can be widely applied to a small device.

A sub-rotor magnet 36 is formed by a permanent magnet and provided at a rotor yoke 7 in a cylindrical shape so as to face the flat armature coil 35. The sub-rotor magnet 36 is rotatably supported by a housing 46 via a first bearing 44 and a second bearing yoke 45. The sub-rotor magnet 36 is rotated by a magnetic field generated by the flat armature coil 35.

An air space between the sub-rotor magnet 36 and the flat armature coil 35 is sealed by the barrier part 33 to which the end part of the housing 46 is extended and the end case 38.

Because of this, leakage of the magnetic flux in a direction perpendicular to a shaft center is prevented. As a result of this, it is possible to obtain high electric motor efficiency.

An inside rotor magnet 209 is formed by a disk shaped permanent magnet. The flat armature coil 35 is put between the main rotor magnet 32 and the sub-rotor magnet 36. The main rotor magnet 32 concentrically faces the sub-rotor magnet 36 having opposite poles. The main rotor magnet 32 and the sub-rotor magnet 36 form a pair. The main rotor magnet 32 is synchronously rotated by a magnetic attraction force of the sub-rotor magnet 36 due to the magnetic field of the flat armature coil 35.

In addition, although rotational shafts of the sub-rotor magnet 36 and the main rotor magnet 32 are concentrically provided, the rotational shafts of the sub-rotor magnet 36 and the main rotor magnet 32 are arranged independently from each other. Therefore, the sub-rotor magnet 36 and the main rotor magnet 32 are completely partitioned. Therefore, generated output torque is directly transmitted to an output shaft 42.

It is general practice that the sub-rotor magnetic 36 and the main rotor magnet 32 have surface magnet type structures where the permanent magnet is arranged on a circumference of the rotor. However, the outside rotor magnet 210 and the inside rotor magnet 209 may have embedded magnet type structures where the permanent magnet is provided inside of the rotor.

An aeolotropic ferrite magnet or a rare-earth magnet having high magnetic flux density is often used as a material of the permanent magnet.

In addition, the sub-rotor magnetic 36 and the main rotor magnet 32 between which the flat armature coil 35 is put face each other and the air space between the sub-rotor magnet 36 and the flat armature coil 35 is sealed by the barrier part 33 and the end case 38. Because of this, leakage of magnetic flux that links the flat armature coil 35 is held to a minimum.

Therefore, decline of the output torque is held to a minimum so that the efficiency of the electric motor can be maintained. Hence, it is possible to prevent the increase of an electric current of the flat armature coil 35 for supplementing the output torque so that the efficiency of the electric motor can be obtained.

Furthermore, the contaminants generated from the flat armature coil 35 are completely shielded from the main rotor magnet 32, the output shaft 43 and the driven device not shown. Hence, the service life of the driven device can maintained for a long time.

The output shaft 42 is concentrically engaged with a pump inside yoke 31 where the main rotor magnet 32 is connected. The output shaft 42 is fixed to the pump inside yoke 31 at a screw hole 43 by a fixing part such as a screw not shown. An end of the output shaft 42 is supported by an end part of the housing 46 via a sleeve 40. The output shaft 42 is rotated by the rotation of the main rotor magnet 32 so as to make the driven device not shown but connected to the output shaft 42 rotate.

Because of this, the generated output torque is transmitted to the output shaft 42. As a result of this, necessary transmission torque is similar to the rated torque so as to be securely transmitted to the driven device not shown.

The housing 46 is formed in a body with the barrier part 33 formed by extension of one end of the housing 46. The housing 46 is fixed to the end case 38 forming a part of the housing of the electric motor by a bolts not shown.

The disk shaped barrier part 33 as a sealing part of a barrier structure extends from one end of the housing 46 as shown in FIG. 3 and isolates the flat armature coil 35 and the sub-rotor magnet 36 from the main rotor magnet 32.

The barrier part 33 partitions and seals the flat armature coil 35 and the sub-rotor magnet 36, together with the housing 46, the barrier part 33, and the end case 38 forming the part of the housing of the electric motor.

Because of this, leakage of the magnetic flux in a direction perpendicular to a shaft center is prevented so that it is possible to obtain high electric motor efficiency.

In addition, the contaminants generated from the flat armature coil 35 are completely shielded from the main rotor magnet 32, the output shaft 42 and the driven device not shown. Hence, the service life of the driven device can maintain for a long time.

The sealing part of the barrier structure is made of a non-magnetic material. For example, a non-magnetic metal basically can be used as the material of the sealing part of the barrier structure.

As a armature electric current control device not shown, a hole IC 34 where a hole element and an amplifier circuit are integrated is preferably used.

The hole IC 34 is provided on the printed circuit board 41 situated in the coreless center of the flat armature coil 35 so as to face the sub-rotor magnet 36. A magnetic pole position of the sub-rotor magnet 36, namely a switching point from a pole N to a pole S or from the pole S to the pole N is detected so that direct electric current is controlled by a single from the hole IC 34.

Accordingly, by arranging the flat armature coil 35 and the sub-rotor magnet 36 to the inside of the end case 38 and the barrier part 33, the hole IC 34 can be operated by only the sub-rotor magnet 36.

In addition, an armature electric current control device not shown is provided outside of the electric motor housing via a lead line not shown and wired to the hole IC 34. Therefore, the magnetic pole position of the sub-rotor magnet 36 can be securely detected so that it is possible to implement proper rotational control.

The lead line not shown or a lead line from the hole elements is wired via an outlet not shown but provided to the housing of the electric motor.

The driven device not shown, for example, a cryogenic cooler or pump, is connected to the output shaft 42 so as to be rotated by the main rotor magnet 32 and the output shaft 42.

The contaminants generated from the flat armature coil 35 are completely shielded from the main rotor magnet 32, the output shaft 42 and the driven device not shown. Hence, the service life of the driven device can maintained for a long time.

The above-discussed coreless and brushless direct electrical current motor of the first and the second embodiments of the present invention can be widely used for, for example, an industrial apparatus such as a cryogenic cooler or pump which requires high efficient driving for saving energy; an appliance product such as a cooling fan or blower; an information device such as a magnetic disk requiring high precision mechanical rotation, long service life, and small or thin size; an audio visual device such as a tape device; a medical apparatus such as a tube pump.

Third Embodiment

Figure 4:
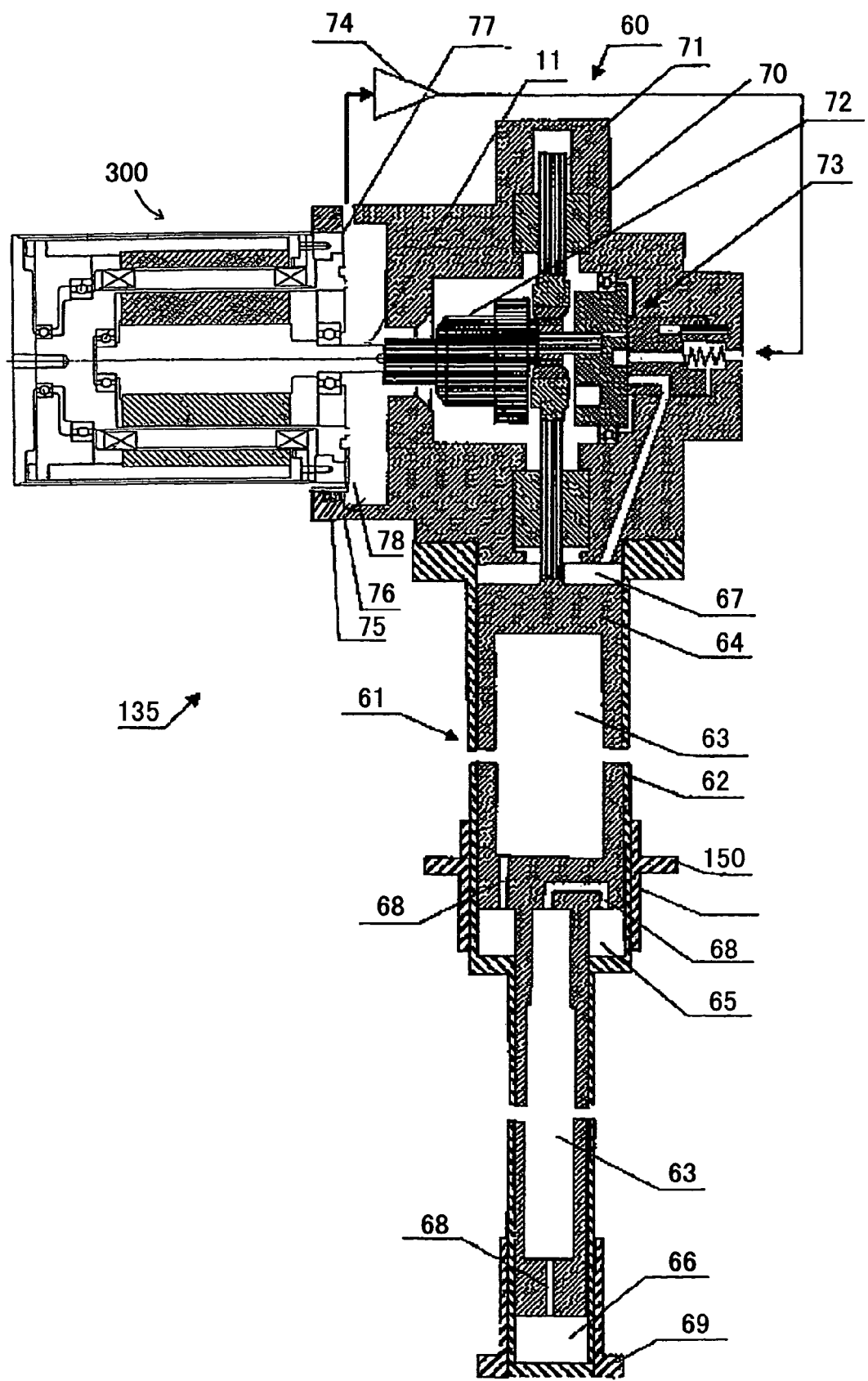
FIG. 4 is a partial cross-sectional view of a Gifford McMahon (GM) cryogenic cooler having the coreless and brushless direct-current motor of the embodiment of the present invention as a power unit.

FIG. 4 is a partial cross-sectional view of a Gifford McMahon (GM) cryogenic cooler having the coreless and brushless direct-current motor 300 of the embodiment of the present invention as a power unit.

In this embodiment, the present invention is applied to the GM cryogenic cooler which requires a barrier for preventing the entrance of contaminates.

The GM cryogenic cooler is used for cooling a cryopump or a superconducting MRI (Magnetic Resonance Imaging) Apparatus. In the GM cryogenic cooler, a compressor and an expansion unit are separately provided. Hence, while a small size compressor is operated at a high speed, the expansion unit is operated at a low speed.

The compressor 74 absorbs operation gas from a low pressure side and discharges the gas to a high pressure side. The cryogenic cooler can be divided into a housing part 60 and a cylinder part 61. A displacer 64 where a cool storage device 63 is installed is slidably provided at a cylinder 62 arranged at two steps, an upper step and a lower step. An empty space (a first step lower empty space) 65, an empty space (a second step lower empty space) 66, and an empty space (an upper empty space) 67 are formed between the displacer 64 and the cylinder 62.

The upper empty space 67 and the first step lower empty space 65 are connected to each other by the displacer 64 where the cool storage device 63 is installed. The first step lower empty space 65 and the second step lower empty space 66 are connected by an operation gas flow path 68.

A second stage 69 as a flange for radiation adheres to a lower part external circumference of the cylinder 62. A first stage 150 is provided at the cylinder part 61 of the first step lower empty space 65.

The displacer 64 is connected to a Scotch yoke 71 as a rotational motion-straight line motion conversion mechanism supported by a sliding bearing 70. The displacer 64 reciprocally moves inside the cylinder 62 by a driving device having the coreless and brushless direct electrical current motor 300 of the first embodiment of the present invention, the crank 72 and the Scotch yoke 71.

When volumes of the first step lower empty space 65 and the second step lower empty space 66 are increased following the reciprocal motion of the displacer 64, a volume of the upper empty space 67 is decreased. In addition, when the volumes of the first step lower empty space 65 and the second step lower empty space 66 are decreased, the volume of the upper empty space 67 is increased. The operation gas moves in the first step lower empty space 65, the second step lower empty space) 66, and the upper empty space 67 via the operation gas flow path 68.

A valve mechanism 73 is provided between the compressor 74 and the cylinder 62. The valve mechanism 73 is formed by a rotary valve device RV configured to control the flow of the operation gas.

The operation gas sent out from the high pressure side of the compressor 74 is led into the cylinder 62. In addition, the operation gas sent out from the cylinder 62 is led into the lower pressure side of the compressor 74.

The driving device having the coreless and brushless direct electrical current motor 300 of the first embodiment of the present invention shown in FIG. 1 is arranged in the housing part 60.

The inside of the housing 60 is, by the barrier, divided into two air spaces, namely, an air space 78 of the operation gas and a receiving space of the coreless and brushless direct electrical current motor 300.

The air space 78 at the output shaft side of the housing 60 separated by a casing as the barrier forms an air space for sending the operation gas sent out from the cylinder 62 to the lower pressure side of the compressor 74.

In this embodiment unlike the conventional art, a part of the coreless and brushless direct electrical current motor 300 of the first embodiment of the present invention is not inserted into the air space 78 for returning the operation gas to the lower pressure side of the compressor 74. Hence, it is possible to prevent the entrance of the contaminants. Because of this, two air spaces, namely, the air space 78 of the operation gas and the receiving space of the coreless and brushless direct electrical current motor 300 of the first embodiment of the present invention can be separately formed by the barrier.

Fourth Embodiment

Figure 5:
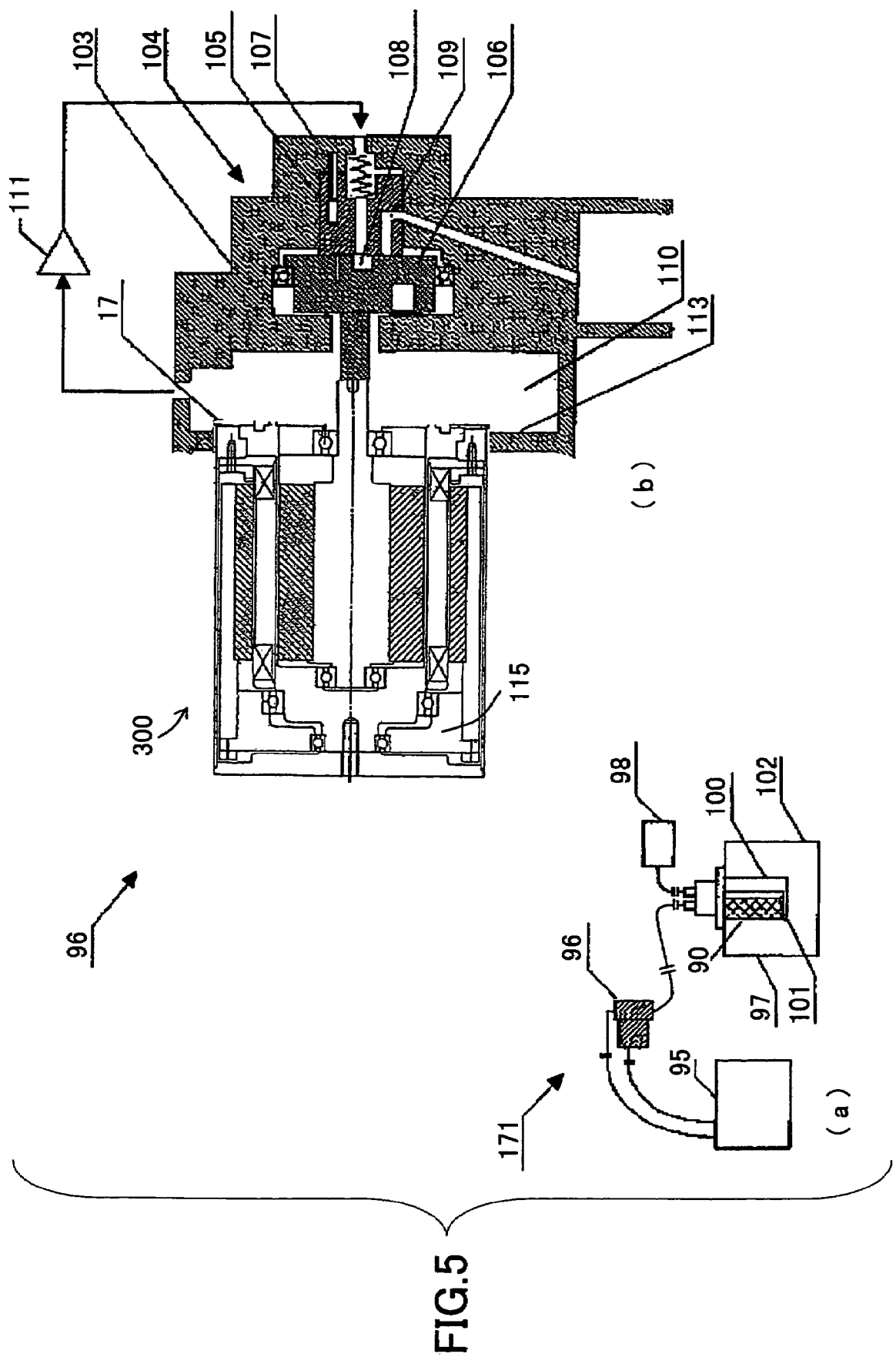
FIG. 5 is a partial cross-sectional view of a pulse tube cryogenic cooler having the coreless and brushless direct-current motor of the embodiment of the present invention as a power unit.

FIG. 5 is a partial cross-sectional view of a pulse tube cryogenic cooler having the coreless and brushless direct-current motor 300 of the embodiment of the present invention as a power unit. More specifically, FIG. 5(a) is a schematic view of whole of the pulse tube cryogenic cooler. FIG. 5(b) is a cross-sectional view of a valve unit of the pulse tube cryogenic cooler.

In this embodiment, the present invention is applied to the pulse tube cryogenic cooler which requires a barrier for preventing entrance of contaminates.

The pulse tube cryogenic cooler, as well as the Stirling type cryogenic cooler or the GM cryogenic cooler, has a cool storage device as a heat exchanger. The pulse tube cryogenic cooler does not have a piston or displacer for the expansion unit. A pipe called a pulse tube works as the expansion unit. Since an operating part such as a piston is not provided at a side of the expansion unit in the pulse tube cryogenic cooler, the pulse tube cryogenic cooler has a lower vibration property and high reliability.

The pulse tube cryogenic cooler is used for various kinds of the superconducting magnet devices, various sensor cooling systems, a liquefying device, a liquefied gas re-condensing device, the cryopump, an MRI diagnosis device, a physical and chemical device, and others.

A pulse tube cryogenic cooler 171 includes a compressor 95, a valve unit 96, a cold head 97, and a buffer tank 98.

The compressor 95 compresses operation gas, supplies the operation gas as high pressure gas to the cold head 97, and receives low pressure gas from the cold head 97.

The valve unit 96 is provided so as to connect the compressor 95 and the cold head 97. A high pressure side or low pressure side of the compressor 95 is mutually connected to the cold head 97.

The cold head 97 includes a cool storage device 90, a pulse tube 100, a low temperature end connection part 101, and a vacuum chamber 102.

A high temperature end side of the cool storage device 90 is connected to the valve unit 96. A high temperature end side of the pulse tube 100 is connected to the buffer tank 98. A low temperature end side of the cool storage device 90 and a low temperature end side of the pulse tube 100 are connected by the low temperature end connection part 101.

The cool storage device 90, the pulse tube 100, and the low temperature end connection part 101 are received in the vacuum chamber 102.

The buffer tank 98 receives the operation gas flowing out from the pulse tube 100. The buffer tank 98 works as a phase control mechanism configured to control phase difference between pressure change and flow rate change of the operation gas in the pulse tube 100.

A power unit which uses the coreless and brushless direct-current motor 300 of the embodiment of the present invention is applied to the valve unit 96.

As shown in FIG. 5(b), the valve unit 96 has a structure where a rotary valve type valve mechanism 104 and a power unit are received in the housing 103 while they are connected. The inside of the housing 103 is divided into an air space 110 and an air space 115.

The valve mechanism 104 includes a valve main body 105 and a valve plate 106. The valve main body 105 is fixed into the housing 103 by a fixing pin 107.

The valve plate 106 is connected to the output shaft of the coreless and brushless direct-current motor 300.

When the valve plate 106 is rotated by the motor 300, the operation gas supplied to the valve main body 105 is supplied to the pulse tube 100 via a guiding groove 108 of the valve plate 106 and a guiding path 109 of the valve main body 105.

The operation gas used in the pulse tube 100 is discharged to the space 110 by the housing 103 and the casing 113 having the barrier 17 via a guiding path 109 of the valve main body 105 and a piercing hole (not shown) of the valve plate 106, and is returned to the compressor 111 via a low pressure flow path.

Since the operation gas discharged to the housing 103 is isolated in the space 110 of the casing 113, the operation gas does not come in contact with the coreless and brushless direct-current motor 300.

Because of this, it is possible to prevent contaminants from the power unit having the coreless and brushless direct-current motor 300 of the first embodiment of the present invention from being mixed into the return flow path 110 to the compressor 111.

In addition, since the coreless and brushless direct-current motor 300 of a lower speed and a high torque is used, it is possible to achieve low noise and decrease the cooling temperature.

Fifth Embodiment

Figure 6:
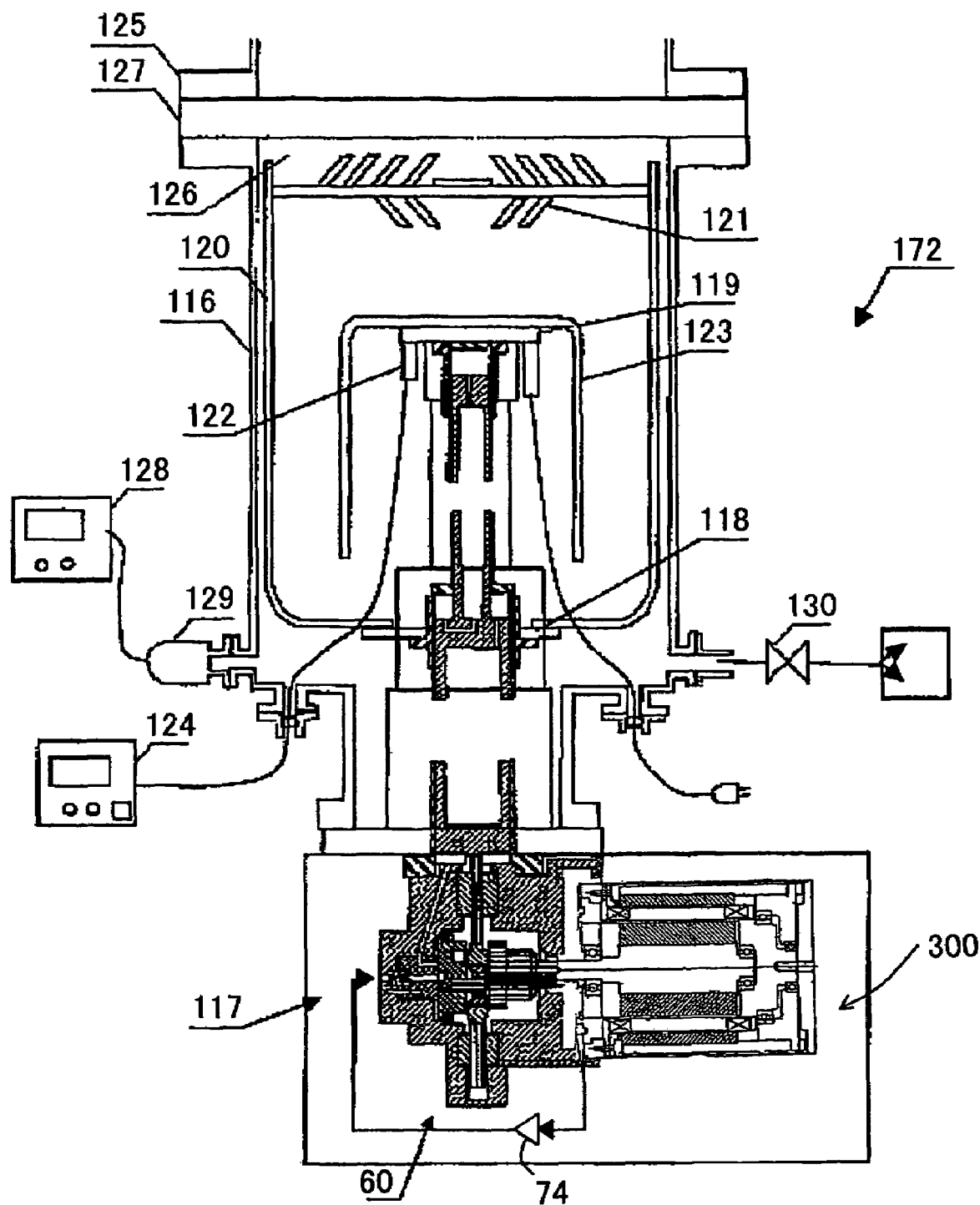
FIG. 6 is a partial cross-sectional view of a cryopump having the coreless and brushless direct-current motor of the embodiment of the present invention as a power unit.

FIG. 6 is a partial cross-sectional view of a cryopump having the coreless and brushless direct-current motor 300 of the embodiment of the present invention as a power unit.

A cryopump 172 shown in FIG. 6 is used for vacuum evacuation of a vacuum processing device.

The cryopump 172 has a structure where a cryogenic cooler 117 is attached to a cryopump container 116. The cryogenic cooler 117 can cool at approximately 10 Kelvin (K).

A first stage of this 10 K cryogenic cooler is cooled at approximately 60 through 100 K and a second stage of this 10 K cryogenic cooler is cooled at approximately 10 K.

A radiation shield 120 is provided at the first stage 118. A louver 121 is attached at an air intake side of the first stage 118. A second temperature sensor 122 and a cryo-panel 123 as a discharge panel are attached to the second stage 119. A second temperature sensor 122 is connected to a temperature gage 129.

The vacuum processing device 125 and the air intake opening 126 are connected via an air intake valve 127. Water vapor or carbon dioxide entering from the vacuum processing device 125 via the air intake valve 127 is condensed by the louver 121 or the radiation shield 120. Gas such as argon, nitrogen, hydrogen, neon, and the like is condensed on the cryo-panel 123, cooled at a temperature equal to or lower than 20 K and discharged.

A vacuum sensor 129 and a vacuum valve 130 are attached to the cryopump container 116. The vacuum sensor 129 is connected to a vacuum gage 128. The vacuum valve 130 is connected to another vacuum pump for discharging inside of the cryopump.

A second steps GM cryogenic cooler is used as the 10K cryogenic cooler 117. The GM cryogenic cooler has a structure shown in FIG. 4, for example. The pulse tube type cryogenic cooler shown in FIG. 5 may be used.

Only the output shaft side of the coreless and brushless direct-current motor 300 of the first embodiment of the present invention is inserted into a flow path for returning the operation gas to the lower pressure side of the compressor 74. Therefore, in his embodiment unlike the conventional art, a part of the motor is not inserted and therefore it is possible to prevent entrance of the contaminants.

Since the cryogenic cooler in this embodiment uses a power unit having the coreless and brushless direct-current motor 300 of the first embodiment of the present invention, it is possible to achieve low noise and decrease the cooling temperature with little vibration. Therefore, there is little influence of noise on measured data so that cooling ability can be improved.

Sixth Embodiment

Figure 7:
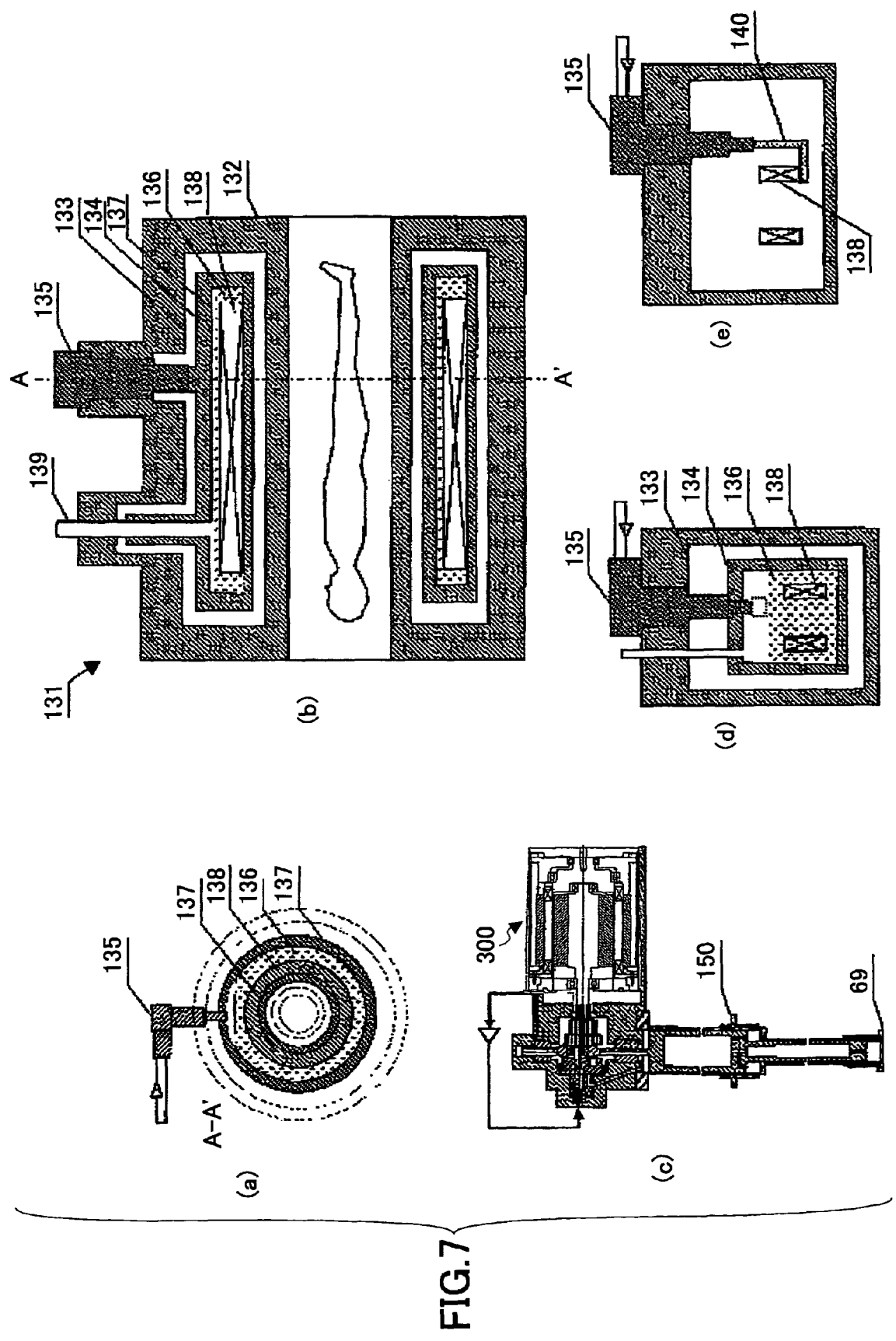
FIG. 7 is a partial cross-sectional view of a Magnetic Resonance Imaging (MRI) apparatus having the coreless and brushless direct-current motor of the embodiment of the present invention as a power unit.

FIG. 7 is a partial cross-sectional view of a Magnetic Resonance Imaging (MRI) apparatus having the coreless and brushless direct-current motor 300 of the embodiment of the present invention as a power unit.

As shown in FIG. 7(a) and FIG. 7(b), the MRI 131 has the following structure. A ring shaped first radiation shield 133 is provided in a ring shaped vacuum chamber 132. The first radiation shield 133 has a rectangular shaped cross-section in a radial direction. The vacuum chamber 132 also has a rectangular shaped cross-section in a radial direction.

A ring shaped second radiation shield plate 134 is provided in the first radiation shield plate 133. The second radiation shield plate 134 has a rectangular shaped cross-section in a radial direction.

A GM cryogenic cooler 135 is connected to the first radiation shield plate 133 and the second radiation shield plate 134.

A liquid helium tank 137 is provided in the second radiation shield plate 134. Liquid helium 136 is stored in the liquid helium tank 137. A superconducting magnet 138 is arranged in the liquid helium tank 137 so as to be soaked in the liquid helium 136.

A pipe 139 connected to a helium receiving part is connected to the liquid helium tank 137.

A cryostat is arranged on an upper part of the vacuum chamber 132 formed in a cylindrical shape. A gradient magnetic field coil (not shown in FIG. 7) and a radio wave transmitting and receiving probe (not shown in FIG. 7) are arranged at an internal circumferential side of the superconducting magnet (electrostatic field magnet) 138 formed in a cylindrical shape.

The liquid helium tank 137 is surrounded by double radiation shield plates 133 and 134. The temperature of an outside first radiation shield plate 133 is kept at approximately 80 K by the first stage 150 of the GM cryogenic cooler 135. The second radiation shield plate 134 is kept at approximately 20 K by the second stage 69.

Therefore, the amount of evaporation of the liquid helium 136 is drastically reduced. Because of this, this technique is used for a general superconducting magnet such as a superconducting MRI or a superconducting magnet for a crystal pulling device.

If a cooling method of the superconducting magnet 138 is changed from a baby-sitter type for cooling the radiation shield plate to a liquid helium re-condensing type shown in FIG. 7(d), for example, a three steps 4 K-GM cryogenic cooler 135 is used so that the first radiation shield plate 133 and the second radiation shield plate 134 are cooled by the first stage 150 and the second stage 69. As a result of this, helium evaporated by the three steps stage can be re-condensed. This liquid helium re-condensing type is used for a medical MRI.

As shown in FIG. 7(c), a power unit where the coreless and brushless direct-current motor 300 of the embodiment of the present invention is provided with a sealed structure is arranged in the GM cryogenic cooler 135.

Since the structure and effect of the GM cryogenic cooler 135 are as discussed above, explanation of a sealed structure where the barrier is formed is omitted here.

The GM cryogenic cooler is used as a cryogenic cooler of this embodiment. However, the pulse tube type cryogenic cooler shown in FIG. 5 or the like may be used as the cryogenic cooler of this embodiment.

As a method for cooling the superconducting coil, a cryogenic cooler direct cooling method shown in FIG. 7(e) in addition to the liquid helium re-condensing method shown in FIG. 7(d) may be used.

The superconducting magnet 138 of a cryogenic cooler direct cooling type does not require a cryogenic coolant such as liquid nitrogen or liquid helium. This superconducting magnet 138 is formed by combining an oxide superconducting electric current lead 140 and a 4K-GM cryogenic cooler 135.

By using a magnetic cold storage medium, it is possible to further decrease the cooling temperature. Since the superconducting magnet 138 of the cryogenic cooler direct cooling type does not require a liquid helium container, the size of the superconducting magnet 138 of the cryogenic cooler direct cooling type can be made small.

For example, it is possible for the size of the superconducting magnet 138 to be approximately one third of the size of the conventional magnet having the same specifications.

In addition, since the barrier is made to have a cylindrical shape, it is possible to make the barrier thin. Furthermore, if the barrier is reinforced by a reinforcing collar, it is possible to endure against high pressure.

Seventh Embodiment

Figure 8:
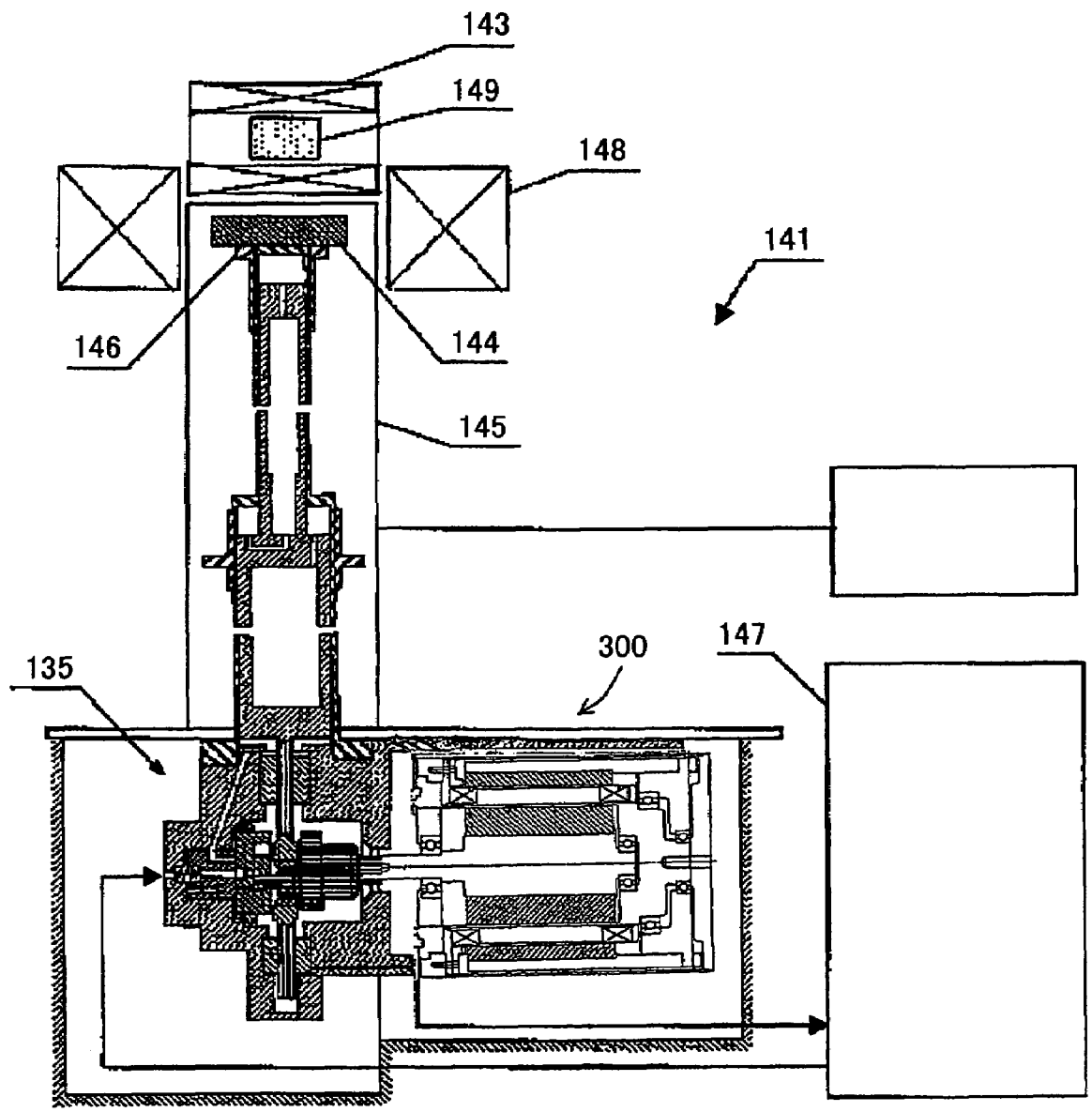
FIG. 8 is a partial cross-sectional view of a Nuclear Magnetic Resonance (NMR) apparatus having the coreless and brushless direct-current motor of the embodiment of the present invention as a power unit.

FIG. 8 is a partial cross-sectional view of a Nuclear Magnetic Resonance (NMR) apparatus having the coreless and brushless direct-current motor 300 of the embodiment of the present invention as a power unit.

A principle of the NMR is based on the following. That is, when an atom having a property of a magnet such as a hydrogen atom is provided in a magnetic field, depending on the frequency of the magnetic field, absorption of magnetic energy may occur. In other words, absorption may be "resonated". An amount of absorption at this time is converted to an electric signal so as to be measured.

An NMR cooling liquid helium condensing cryogenic cooler 141 is formed by a one-step or a two-steps GM cryogenic cooler 135.

In an NMR (MRI) analyzing apparatus shown in FIG. 8, an NMR signal of a test subject provided in the magnetic field is detected by a neighboring detection coil 143.

A superconducting bulk 144 which is synthesized in a cylindrical shape is provided inside a vacuum insulation container 145. The superconducting bulk 144 is made to come in contact with a cooling part (cold head) 146 of the GM cryogenic cooler 135 so as to be fixed.

As the GM cryogenic cooler 135, a small size GM cryogenic cooler is used. By a vacuum pump, the inside of the vacuum insulation container 145 is evacuated so as to be a heat insulator. The GM cryogenic cooler 135 and its compressor 146 are operated so that temperature of the superconducting bulk 144 is decreased and a superconducting state can be formed.

A magnetic field is applied from a polarized coil 148 which is situated outside of the vacuum insulation container 145 to this so that the magnetic field is polarized.

A measurement subject 149 is provided in the magnetic field generated by the superconducting bulk 144 and the detection coil 143 is wound around the measurement subject 149. A high frequency magnetic field in a direction perpendicular to a main magnetic field vertically applied in the measurement subject 149 is applied. Change of magnetization in the perpendicular direction is detected so that the NMR signal is measured.

In addition to the GM cryogenic cooler 135, the pulse tube cryogenic cooler shown in FIG. 5 or the Stirling cryogenic cooler can be applied for the NMR cryogenic cooler.

Since the structure and effect where the power unit using the coreless and brushless direct-current motor 300 of the first embodiment of the present invention is installed including a casing having a barrier is as discussed above, explanation thereof is omitted here.

Detection sensitivity is increased in the detection coil 143 of the NMR apparatus and therefore it is necessary to prevent the influence of the noise. Since the coreless and brushless direct-current motor 300 of the first embodiment of the present invention is operated at low speed and high torque, the frequency of driving electric current is decreased and generation of noise is reduced.

In addition, a gap between a stator winding wire and a rotor of the coreless and brushless direct-current motor 300 of the first embodiment of the present invention is close as usual. Therefore, generation of leakage of magnetic flux is reduced in this structure unlike a conventional structure where a barrier is provided for sealing between the stator winding wire and the rotor of the motor.

Therefore, as compared to the conventional art, the efficiency and the torque property of the coreless and brushless direct-current motor 300 of the first embodiment of the present invention is improved. As a result of this, generation of noise is reduced and cooling ability can be improved.

Eighth Embodiment

Figure 9:
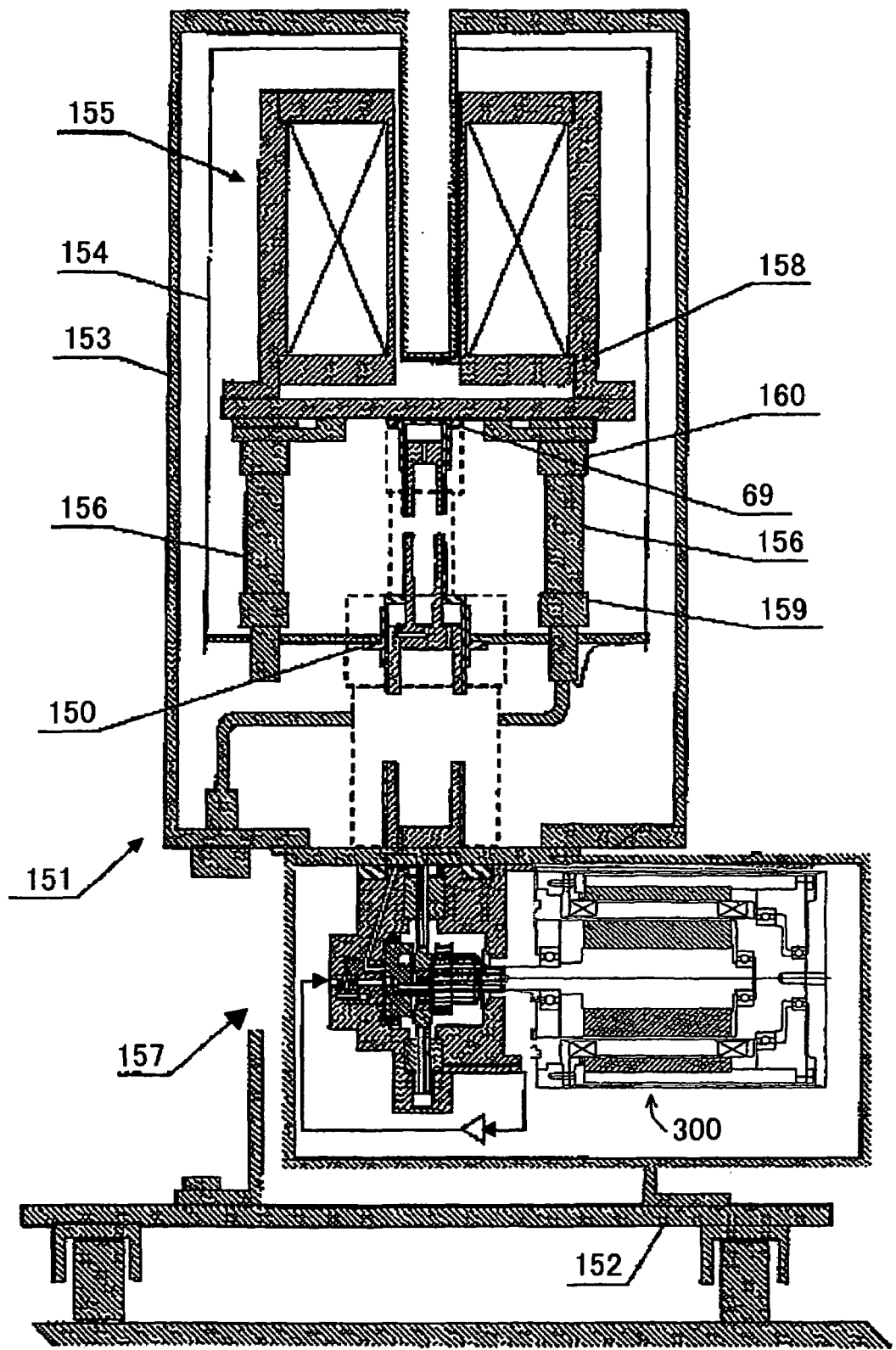
FIG. 9 is a partial cross-sectional view of a Superconducting Magnet (SCM) apparatus having the coreless and brushless direct-current motor of the embodiment of the present invention as a power unit.

FIG. 9 is a partial cross-sectional view of a Superconducting Magnet (SCM) apparatus having the coreless and brushless direct-current motor 300 of the embodiment of the present invention as a power unit.

A conduction cooling type superconducting magnet apparatus 151 shown in FIG. 9 has a structure where a high temperature superconducting electric current lead together with a superconducting coil is cooled by a cryogenic cooler.

The conduction cooling type superconducting magnet apparatus 151 shown in FIG. 9 includes a base 152, a vacuum container 153, a thermal shield plate 154, a superconducting coil 155, an oxide superconducting electric current lead 156 having positive and negative poles couple, and a cold storage type cryogenic cooler 157.

The thermal shield plate 154 contacts and is fixed to a first stage 150 of the cold storage type cryogenic cooler 157. The thermal shield plate 154 prevents heat from entering the superconducting coil 155 and the oxide superconducting electric current lead 156.

By contacting and fixing an external circumference cooling copper block and a coil former 158 to a second stage 69 of the cold storage type cryogenic cooler 157, it is possible to cool the superconducting line material at cryogenic temperature.

Positive and negative pole coupling of the oxide superconducting electric current lead 156 is provided. The oxide superconducting electric current lead 156 is connected to an outside electric power source via an electric current lead terminal and a normal conducting electric current lead. A high temperature side end part 159 is connected to a first stage 150 of the cold storage type cryogenic cooler 157. A low temperature side end part 160 is connected to the second stage 69.

An optional cryogenic cooler such as a pulse tube cryogenic cooler shown in FIG. 5 or the GM cryogenic cooler shown in FIG. 4 can be applied to the cold storage type cryogenic cooler 157. The first stage 150 can be cooled at approximately 80 K. The second stage 60 can be cooled at the cryogenic temperature of approximately 4 through 10 K.

Since the sealed structure and effect of the GM cryogenic cooler where the power unit using the coreless and brushless direct-current motor 300 of the first embodiment of the present invention is installed including a casing having the barrier is discussed above, explanation thereof is omitted here.

Since the cryogenic cooler is commonly used for cooling the superconducting coil and the high temperature superconducting electric current lead, it is possible to make the size of the entirety of the apparatus small or compact.

In addition, since sealing is performed by the casing including the barrier of the coreless and brushless direct-current motor 300 of the first embodiment of the present invention and a flow path of a coolant of the cryogenic cooler, the casing can be commonly used for the sealing barrier.

Furthermore, since the coreless and brushless direct-current motor 300 of the first embodiment of the present invention is operated at low speed and high torque, it is possible to prevent generation of unnecessary noise and to improve a cooling ability.

Ninth Embodiment

Figure 10:
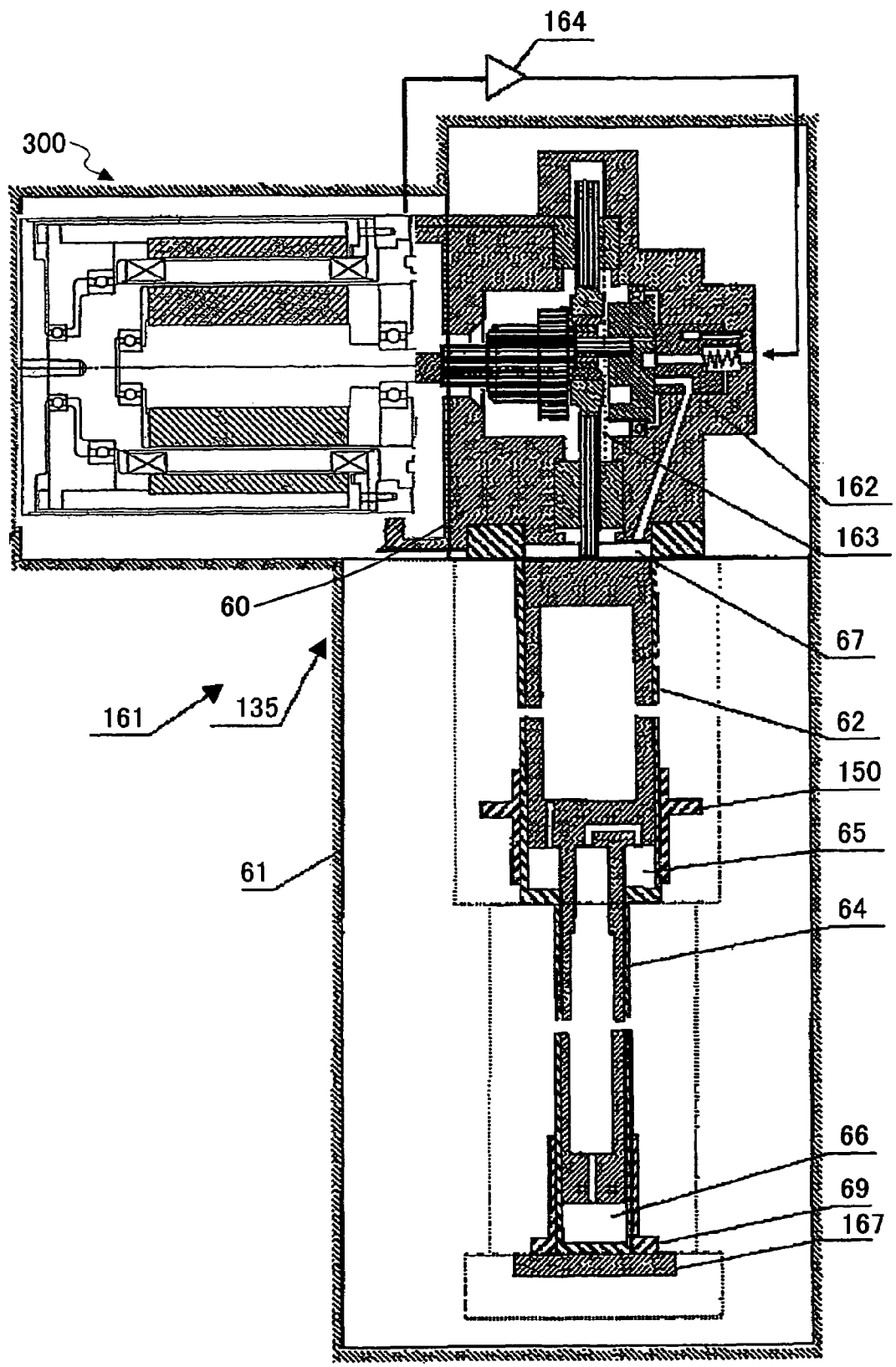
FIG. 10 is a partial cross-sectional view of a cryogenic cooler for cooling a semiconductor having the coreless and brushless direct-current motor of the embodiment of the present invention as a power unit.

FIG. 10 is a partial cross-sectional view of a cryogenic cooler for cooling a semiconductor having the coreless and brushless direct-current motor 300 of the embodiment of the present invention as a power unit.

A semiconductor radiation ray detecting apparatus having a cooler for cooling semiconductor cools a semiconductor detection element and detects a radiation ray.

A cooler 161 for cooling semiconductor includes a GM cryogenic cooler 135. The cooler 161 is mainly formed by a housing part 60 and a cylinder per 61. Here, instead of the GM cryogenic cooler 135, the pulse tube cryogenic cooler shown in FIG. 5 or the like can be used for the cooler 161.

The housing part 60 includes a valve switching mechanism 162, a rotation-linear motion switching mechanism 163 for driving a piston, a magnetic coupling mechanism 67, and a brushless direct-current motor 164. The magnetic coupling mechanism 67 transmits a rotational force to the valve switching mechanism 162 and the rotation-linear motion switching mechanism 163.

By the rotational force of the coreless and brushless direct-current motor 300 of the first embodiment of the present invention, the valve switching mechanism 162 supplies a high pressure side operation fluid of the compressor 165 to an empty space formed by the cylinder and the displacer. In addition, the valve switching mechanism 162 operates the rotation-linear motion switching mechanism 163 and switches the fluid path so that the operation gas in the empty spaces 65 through 67 is returned to a low pressure side of the compressor 165.

On the other hand, the cylinder part 61 has the following structure. That is, the displacer 64 where cold storage device is installed is slidably provided in the cylinder 62 in two steps, an upper part and a lower part, so that the first stage 150 and the second stage 69 are provided.

A semiconductor for measurement or a semiconductor element 167 is provided on the second stage 69 forming the cold head.

Since the cold head can be cooled at approximately 4 K by using the 4 K GM cryogenic cooler, it is possible to improve the detection ability of the semiconductor.

In the power unit having the coreless and brushless direct-current motor 300 of the first embodiment of the present invention, as discussed above, the casing having a packing or the barrier can be attached to the housing of the cryogenic cooler in a sealing state.

Since only the output shaft side of the coreless and brushless direct-current motor 300 of the first embodiment of the present invention is inserted in the flow path by which the operation gas is returned to the lower pressure side of the compressor 164 in this embodiment unlike the conventional art where the part of the motor is inserted, it is possible to prevent mixing of contaminants.

Because of the packing made of rubber such as an O ring provided in a concave groove of an upper magnet coupling mechanism casing, it is possible to keep the housing 60 of the cryogenic cooler and the casing of the coreless and brushless direct-current motor 300 of the first embodiment of the present invention in a sealing state.

Since the cryogenic cooler uses the power unit discussed above, there is little vibration. In addition, the cryogenic cooler can be operated at low speed and high torque. Therefore, influence of vibration or noise against the semiconductor or the semiconductor element can be little. Hence, it is possible to improve the detection ability of the semiconductor and the semiconductor element and the cooling ability.

Thus, according to the above-discussed embodiments of the present invention, it is possible to provide a coreless and brushless direct-current motor, including: an armature coil wound without core and formed in the shape of a saddle, the armature coil including a plurality of coils separately provided on an external surface with a cylindrical circumference, the armature coil generating a magnetic field in a case where a direct current is applied; an outside rotor magnet formed by a permanent magnet, the outside rotor magnet being provided at an outside of the armature coil in the shape of a cylinder so as to face the armature coil, the outside rotor magnet being rotated by the magnetic field; an inside rotor magnet formed by a permanent magnet, the inside rotor magnet being provided in the shape of a cylinder at an inside of the armature coil so that the inside rotor magnet has a pole opposite to the outside rotor magnet and a rotational shaft is independently provided, the inside rotor magnet rotated synchronously with the outside rotor magnet by the magnetic field; an output shaft connected to the inside rotor magnet, the output shaft being rotated following rotation of the inside rotor magnet and making a connected driven device rotate; and a sealing part of a barrier structure which sealing part partitions the armature coil and the outside rotor magnet to an outside of the inside rotor magnet and seals the armature coil and the outside rotor magnet.

In other words, according to the coreless and brushless direct-current motor 300 of a first embodiment of the present invention, as shown in FIG. 1 and FIG. 2, the armature coil 204 is wounded without a core and in the shape of a saddle. The armature coil 204 includes plural coils separately provided on the outside surface of a cylindrical circumference. When a direct current is applied to the armature coil 204, a magnetic field is generated.

The outside rotor magnet 210 formed by a permanent magnet is provided in the shape of a cylinder so as to face the armature coil 204. The outside rotor magnet 210 is rotated by a magnetic field generated by the armature coil 204.

The inside rotor magnet 209 formed by a permanent magnet in the shape of a cylinder is provided inside of the armature coil 204 so that the inside rotor magnet 209 has a pole opposite to the outside rotor magnet 210 and a rotational shaft is independently provided. The inside rotor magnet 209 is rotated synchronously with the outside rotor magnet 210 by a magnetic field of the armature coil 204.

Because of this, the outside rotor magnet 210 and the inside rotor magnet 209 are rotated by the magnetic field of the armature coil 204. Hence, output torques generated by the rotations are combined so that a strong torque can be formed.

The output shaft 206 is connected to the inside rotor magnetic 209. The output shaft 206 is rotated following rotation of the inside rotor magnet 209 and makes the connected driven device rotate.

Because of this, the generated output torque is transmitted to the driven device such as the cryogenic cooler or the pump not shown securely connected via the output shaft 206.

The sealing part 219 of the barrier structure partitions the armature coil 204 and the outside rotor magnet 210 to the outside of the inside rotor magnet 209 and seals the armature coil 204 and the outside rotor magnet 210.

Because of this, leakage of the magnetic flux in a direction parallel with a shaft center is prevented so that it is possible to obtain high electric motor efficiency.

In addition, the contaminants generated from the armature coil 204 is completely shielded from the inside rotor magnet 2b9, the output shaft 206 and the driven device not shown. Hence, a life time of the driven device can maintain for a long time.

In the coreless and brushless direct-current motor, the sealing part of the barrier structure may include a housing rotatably supporting the output shaft where the inside rotor magnet is connected; a barrier part extending from an end of the housing and partitioning the armature coil and the outside rotor magnet to the outside of the inside rotor magnet; and a casing, together with the housing and the barrier part, sealing the armature coil and the outside rotor magnet from the inside rotor magnet.

In other words, as shown in FIG. 1, the housing 218 rotatably supports the output shaft where the inside rotor magnet is connected. The barrier part 219 extends from the end of the housing 218 and partitions the armature coil 204 and the outside rotor magnet 210 to the outside of the inside rotor magnet 209. The casing 202 together with the housing 218 and the barrier part 219 seals the armature coil 204 and the outside rotor magnet 210 from the inside rotor magnet 209.

Because of this, the contaminants generated from the armature coil 204 are completely shielded from the inside rotor magnet 209, the output shaft 206 and the driven device not shown. Hence, the service life of the driven device can maintained for a long time.

It is possible to provide a coreless and brushless direct-current motor, including: a flat armature coil wounded without a core, the flat armature coil including a plurality of coils separately provided on an external surface with a cylindrical circumference, the flat armature coil generating a magnetic field in a case where a direct current is applied; a sub-rotor magnet formed by a permanent magnet, the sub-rotor magnet being provided in the shape of a cylinder so as to face the flat armature coil, the sub-rotor magnet being rotated by the magnetic field; a main rotor magnet formed by a permanent magnet, the main rotor magnet having a pole opposite to the sub-rotor magnet where a rotational shaft is independently and concentrically provided and the flat armature coil is put between the main rotor magnet and the sub-rotor magnet, the main rotor magnet synchronously rotated with the sub-rotor magnet by the magnetic field; an output shaft connected to the main rotor magnet, the output shaft being rotated following rotation of the main rotor magnet and making a connected driven device rotate; and a sealing part of a barrier structure, the sealing part partitioning the flat armature coil and the sub-rotor magnet to an outside of the main rotor magnet and sealing the flat armature coil and the sub-rotor magnet.

In other words, as shown in FIG. 3, the flat armature coil 35 is wound without a core. The flat armature coil 35 includes plural coils separately provided on the outside surface of a cylindrical circumference. When a direct current is applied to the flat armature coil 35, a magnetic field is generated.

The sub-rotor magnet 36 formed by a permanent magnet is provided in a cylindrical shape so as to face the flat armature coil 35. The sub-rotor magnet 36 is rotated by a magnetic field generated by the flat armature coil 35.

The flat armature coil 35 is put between the main rotor magnet 32 and the sub-rotor magnet 36. The main rotor magnet 32 formed by a permanent magnet has a pole opposite to the sub-rotor magnet 36 and a rotational shaft is independently and concentrically provided. The main rotor magnet 32 is synchronously rotated with the sub-rotor magnet 36 by a magnetic field of the flat armature coil 35.

Because of this, the sub-rotor magnet 36 and the main rotor magnet 32 are rotated by the magnetic field of the flat armature coil 35. Hence, output torques generated by the rotations are combined so that a strong torque can be formed. Therefore, it is possible to operate with high efficiency.

The output shaft 42 is connected to the main rotor magnet 32. The output shaft 42 is rotated following rotation of the main rotor magnet 32 and makes the connected driven device rotate.

Because of this, the generated output torque is transmitted to the driven device such as the cryogenic cooler or the pump not shown securely connected via the output shaft 42.

The sealing part of the barrier structure partitions the flat armature coil 35 and the sub-rotor magnet 36 to the outside of the main rotor magnet 32 and seals the flat armature coil 35 and the sub-rotor magnet 36.

Because of this, leakage of the magnetic flux in a direction perpendicular to a shaft center is prevented so that it is possible to obtain high electric motor efficiency.

In addition, the contaminants generated from the flat armature coil 35 are completely shielded from the main rotor magnet 32, the output shaft 42 and the driven device not shown. Hence, the service life of the driven device can maintain for a long time.

In the coreless and brushless direct-current motor, the sealing part of the barrier structure may include: a housing rotatably supporting the output shaft where the main rotor magnet is connected; a barrier part extending from an end of the housing and partitioning the flat armature coil and the sub-rotor magnet to the outside of the main rotor magnet; and an end case, together with the housing and the barrier part, sealing the flat armature coil and the sub-rotor magnet from the main rotor magnet.

In other words, as shown in FIG. 3, the housing 46 forming the sealing part of the barrier structure rotatably supports the output shaft 42 where the main rotor magnet 32 is connected.

The barrier part 33 extends from the end of the housing 46 and partitions the flat armature coil 35 and the sub-rotor magnet 36 to the outside of the main rotor magnet 32. The end case 38 together with the housing 46 and the barrier part 33 seals the flat armature coil 35 and the sub-rotor magnet 36 from the main rotor magnet 32.

Because of this, the contaminants generated from the flat armature coil 35 are completely shielded from the main rotor magnet 32, the output shaft 42 and the driven device not shown. Hence, the service life of the driven device can maintained for a long time.

It is also possible to provide a Gifford McMahon cryogenic cooler, including: a power unit made by the coreless and brushless direct-current motor discussed above; a rotational motion-straight line motion conversion mechanism configured to convert a rotational motion of the power unit to a straight line motion; a valve mechanism configured to receive a rotational output of the power unit and to switch a flow path of operation fluid sent out from a high pressure side of a compressor to a low pressure side of the compressor; a cylinder configured to take the operation fluid supplied and discharged by the valve mechanism so as to cool the operation fluid at an optional numbers of stages; and a displacer having a plurality of cold storage devices.

It is also possible to provide a pulse tube cryogenic cooler, including: a cold head; a compressor configured to supply operation gas with a high pressure to the cold head and receive the operation gas from the cold head as low pressure gas; a valve unit connected between the cold head and the compressor and mutually connecting a high pressure side and a low pressure side of the compressor to the cold head; a buffer tank configured to control phase difference between pressure change and a flow rate change of the operation gas; and the coreless and brushless direct-current motor as discussed above, the coreless and brushless direct-current motor being configured to rotate the valve unit.

It is also possible to provide a cryopump, MRI apparatus, Superconducting Magnet apparatus, NMR apparatus, and cryogenic cooler for cooling a semiconductor where the coreless and brushless direct current electrical current motor is used as a power unit.

According to the above-mentioned GM cryogenic cooler, pulse tube cryogenic cooler, cryopump, MRI apparatus, Superconducting Magnet apparatus, NMR apparatus, and cryogenic cooler for cooling a semiconductor, since the coreless and brushless direct current electrical current motor is used as a power unit, it is possible to achieve good cooling abilities.

The present invention is not limited to these embodiments, but variations and modifications may be made without departing from the scope of the present invention.

This patent application is based on Japanese Priority Patent Application No. 2006-205435 filed on Jul. 27, 2006, the entire contents of which are hereby incorporated by reference.

What is claimed is:

1. A Gifford McMahon cryogenic cooler, comprising:
   a power unit made by a coreless and brushless direct-current motor, the coreless and brushless direct-current motor including:
   an armature coil wound without core and formed in the shape of a saddle, the armature coil including a plurality of coils separately provided on an external surface with a cylindrical circumference, the armature coil generating a magnetic field in a case where a direct current is applied;
   an outside rotor magnet formed by a permanent magnet, the outside rotor magnet being provided at an outside of the armature coil in the shape of a cylinder so as to face the armature coil, the outside rotor magnet being rotated by the magnetic field;
   an inside rotor magnet formed by a permanent magnet, the inside rotor magnet being provided in the shape of a cylinder at an inside of the armature coil so that the inside rotor magnet has a pole opposite to the outside rotor magnet and a rotational shaft is independently provided, the inside rotor magnet rotated synchronously with the outside rotor magnet by the magnetic field;
   an output shaft connected to the inside rotor magnet, the output shaft being rotated following rotation of the inside rotor magnet and making a connected driven device rotate;
   a sealing part of a barrier structure which sealing part partitions the armature coil and the outside rotor magnet to an outside of the inside rotor magnet and seals the armature coil and the outside rotor magnet; and
   an outside casing sized to receive and surround the armature coil, the outside rotor magnet, the insider rotor magnet and the sealing part with the output shaft projecting outwardly therefrom;
   a rotational motion-straight line motion conversion mechanism configured to convert a rotational motion of the power unit to a straight line motion, the rotational motion-straight line motion conversion mechanism including a conversion mechanism housing;
   a valve mechanism configured to receive a rotational output of the power unit and to switch a flow path of operation fluid sent out from a high pressure side of a compressor to a low pressure side of the compressor;
   a cylinder configured to take the operation fluid supplied and discharged by the valve mechanism so as to cool the operation fluid at an optional numbers of stages; and
   a displacer having a plurality of cold storage devices,
   wherein the outside casing and the conversion mechanism housing are fixedly connected to each other in a stationary manner.

2. A Gifford McMahon cryogenic cooler, comprising:
   a power unit made by the coreless and brushless direct-current motor, the coreless and brushless direct-current motor, including:

an armature coil wound without core and formed in the shape of a saddle, the armature coil including a plurality of coils separately provided on an external surface with a cylindrical circumference, the armature coil generating a magnetic field in a case where a direct current is applied, an outside rotor magnet formed by a permanent magnet, the outside rotor magnet being provided at an outside of the armature coil in the shape of a cylinder so as to face the armature coil, the outside rotor magnet being rotated by the magnetic field, an inside rotor magnet formed by a permanent magnet, the inside rotor magnet being provided in the shape of a cylinder at an inside of the armature coil so that the inside rotor magnet has a pole opposite to the outside magnet magnet and a rotational shaft is independently provided, the inside rotor magnet rotated synchronously with the outside rotor magnet by the magnetic field, an output shaft connected to the inside rotor magnet, the output shaft being rotated following rotation of the inside rotor magnet and making a connected driven device rotate, and a sealing part of a barrier structure which sealing part partitions the armature coil and the outside rotor magnet to an outside of the inside rotor magnet and seals the armature coil and the outside rotor magnet;

a rotational motion-straight line motion conversion mechanism configured to convert a rotational motion of the power unit to a straight line motion;

a valve mechanism configured to receive a rotational output of the power unit and to switch a flow path of operation fluid sent out from a high pressure side of a compressor to a low pressure side of the compressor;

a cylinder configured to take the operation fluid supplied and discharged by the valve mechanism so as to cool the operation fluid at an optional numbers of stages; and a displacer having a plurality of cold storage devices, wherein the sealing part of the barrier structure includes:

a housing rotatably supporting the output shaft where the inside rotor magnet is connected;

a barrier part extending from an end of the housing and partitioning the armature coil and the outside rotor magnet to the outside of the inside rotor magnet; and a casing, together with the housing and the barrier part, sealing the armature coil and the outside rotor magnet from the inside rotor magnet.

* * * * *